(12) United States Patent
Rochel et al.

(10) Patent No.: US 6,196,694 B1
(45) Date of Patent: Mar. 6, 2001

(54) AUDIO AMPLIFIER HAVING ILLUMINATED COVER PLATE

(75) Inventors: Sohail Rochel, Los Angeles; Gene Edgar Norvell, Huntington Beach, both of CA (US)

(73) Assignee: Epsilon Electronics, Inc., Commerce, CA (US)

( * ) Notice: Subject to any disclaimer, the term of this patent is extended or adjusted under 35 U.S.C. 154(b) by 0 days.

(21) Appl. No.: 09/179,824

(22) Filed: Oct. 28, 1998

(51) Int. Cl.⁷ ........................................... F21V 9/00
(52) U.S. Cl. ................................. 362/86; 362/87
(58) Field of Search .............................. 362/86, 87, 355, 362/31, 29; 330/59; 359/599; 40/542, 546, 550, 553, 901

(56) References Cited

U.S. PATENT DOCUMENTS

| | | | |
|---|---|---|---|
| 4,765,080 | * | 8/1988 | Conti ........................................ 40/576 |
| 5,336,849 | * | 8/1994 | Whitney ................................... 174/48 |
| 5,546,273 | * | 8/1996 | Harris ...................................... 361/697 |
| 5,690,421 | * | 11/1997 | Shea et al. ............................. 362/293 |
| 6,067,074 | * | 5/2000 | Lueders ................................... 345/156 |

OTHER PUBLICATIONS

"Making Waves", Car Audio and Electronics, Jun. 1998, p. 92.
"Reactor Limited Edition Amplifier" Specification Sheet. Dec. 5, 1997.

* cited by examiner

Primary Examiner—Mohammad Y. Sikder
(74) Attorney, Agent, or Firm—Jacobson, Price, Holman & Stern, PLLC

(57) ABSTRACT

An innovative, unique visual display for a powered car audio amplifier. The audio amplifier includes a transparent cover plate, preferably formed of methyl methacrylate, having a name or pattern etched or engraved in the undersurface of the cover plate. A black light or neon gas light tube surrounds an edge of the cover plate. The light produced from the black light or neon glass tube is transmitted through the cover plate and is collimated at the etched or engraved pattern in the cover plate. The pattern appears illuminated when the pattern is viewed through the cover plate without any visible source of light present. The light also appears to highlight the circuitry of the amplifier chassis located below the cover plate.

7 Claims, 5 Drawing Sheets

AUDIO AMPLIFIER HAVING ILLUMINATED COVER PLATE

FIELD OF THE INVENTION

The present invention relates to an audio amplifier having a transparent cover plate which is illuminated from a side edge by a black light or a neon gas light having a power supply mounted on the amplifier chassis. A design or pattern etched or engraved in the cover plate is highlighted by the concentration of the light source at those areas. A portion of the amplifier circuitry is shielded to prevent alternating current noise produced by the power supply for the black light or neon gas light from interfering with the function of the amplifier.

BACKGROUND OF THE INVENTION

The audio amplifier business is a highly competitive, rapidly changing field particularly audio amplfiers for use in vehicles such as automobiles. There is a constant need for different, aesthetically pleasing improvements in powered auxiliary amplifiers for stereo speakers. This need translates into rapidly changing designs, which are often copied by competitors.

One possible way to thwart appropriation of original designs, is to create an aesthetic affect that will instantly be recognizable as associated with a particular source of origin or manufacturer. This requires a dramatic departure from prior concepts.

One such approach is incorporated in copending design patent application Ser. No. 29/077,849, assigned to the same assignee as the present invention, and herein incorporated in its entirety by reference, and which discloses a face panel of an automobile acoustic amplifier including a transparent cover with twin VU meters. The use of a transparent amplifier cover allows viewing of the interior of the amplifier, as well as viewing vu meters mounted on the amplifier chassis, producing a unique and unusual visual effect. However, a need exists for even greater versatility and options in the selection and presentation of the appearance of an amplifier.

SUMMARY OF THE INVENTION

Accordingly, it is an object of the present invention to provide an innovative, unique visual display for an audio amplifier, particularly a powered car amplifier. This object is accomplished by the use of a transparent cover plate formed of a plastic material capable of "edge lighting", i.e., transmitting light from an edge of a sheet of such material through the material to be concentrated at a design or pattern etched or engraved in the surface thereof. According to the preferred embodiments of this invention the design or pattern is etched or engraved in the undersurface of the cover plate and a black light or neon gas light tube surrounds an edge of the cover plate whereby the light produced from the light source is collimated at the pattern so that, without any visible source of light, the pattern appears illuminated when viewed through the cover plate. Ancilliary light may also highlight the circuitry of the amplifier chassis located below the cover plate, if desired.

Neon is a colorless, odorless gas which may be placed in a vacuum electric discharge tube. When a current is passed through the gas, the neon gas is ionized by the flow of electric current to produce a luminous glow discharge depending on the nature of the gas in the tube, the luminous glow may be any of a variety of colors, including red, blue, purple, aqua and others. A black light produces invisible light, such as ultraviolet rays, which when they fall on fluorescent materials, cause the fluorescent materials to emit visible light. It has been found that the transmission of light from energized neon gas or light produced from a black light is sufficient to traverse a transparent cover plate and reflect from an etched or engraved pattern in the cover plate to highlight the pattern, whereas ordinary incandescent or fluorescent light will not do so.

A conventional converter may be used as the power supply for the black light or neon gas charged tube to convert direct current (DC) from a car battery to high voltage (400–100 volts), low amperage (0.1–1.0 amps) alternating current (AC). However, such a power supply tends to generate high levels of alternating current noise when placed in close proximity with an amplifier chassis of a car audio amplifier which especially interferes with the preamplifier section or low voltage input side of the amplifier chassis.

To avoid this problem when using neon in an automobile, such as in a license plate illumination device, the power supply for the neon gas charged tube has been isolated from the car audio amplifier by locating the power supply in a remote section of the automobile, positioned as far as possible away from the audio amplifier chassis. According to the present invention, it has been found that a black light or neon light can be used in an automobile with its AC power supply in close proximity to a car audio amplifier, and can share the power source for the audio amplifier supplied by the car battery. This is accomplished by shielding the preamplifier section of the car audio amplifier chassis with a metallic hood or cover thereby eliminating the interference caused by the alternating current noise.

Thus, it is now possible to utilize a black light or a neon gas light to illuminate a design in a car audio amplifier cover plate without spacing the power supply in a totally remote location. This saves on space constraints of an automobile storage area as well as eliminating additional wiring necessary to distance the power supply for a black light or neon gas light from the car audio amplifier.

It is therefore another object of the present invention to mount a power supply for a black light or neon gas light on a car audio amplifier chassis and to shield a portion of the amplifier such as the pre-amplifier so as to prevent alternating current noise from affecting the quality of the sound produced by the car audio amplifier.

It is still another object of the present invention to provide a car audio amplifier having a transparent cover plate with a black light or a neon gas light at its side edges to illuminate an etched or engraved pattern formed preferably in a lower surface of the transparent cover plate, with the power supply for the light source mounted on the car audio amplifier chassis and a protective shield covering a pre-amp portion of the amplifier to shield the same from AC interference.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
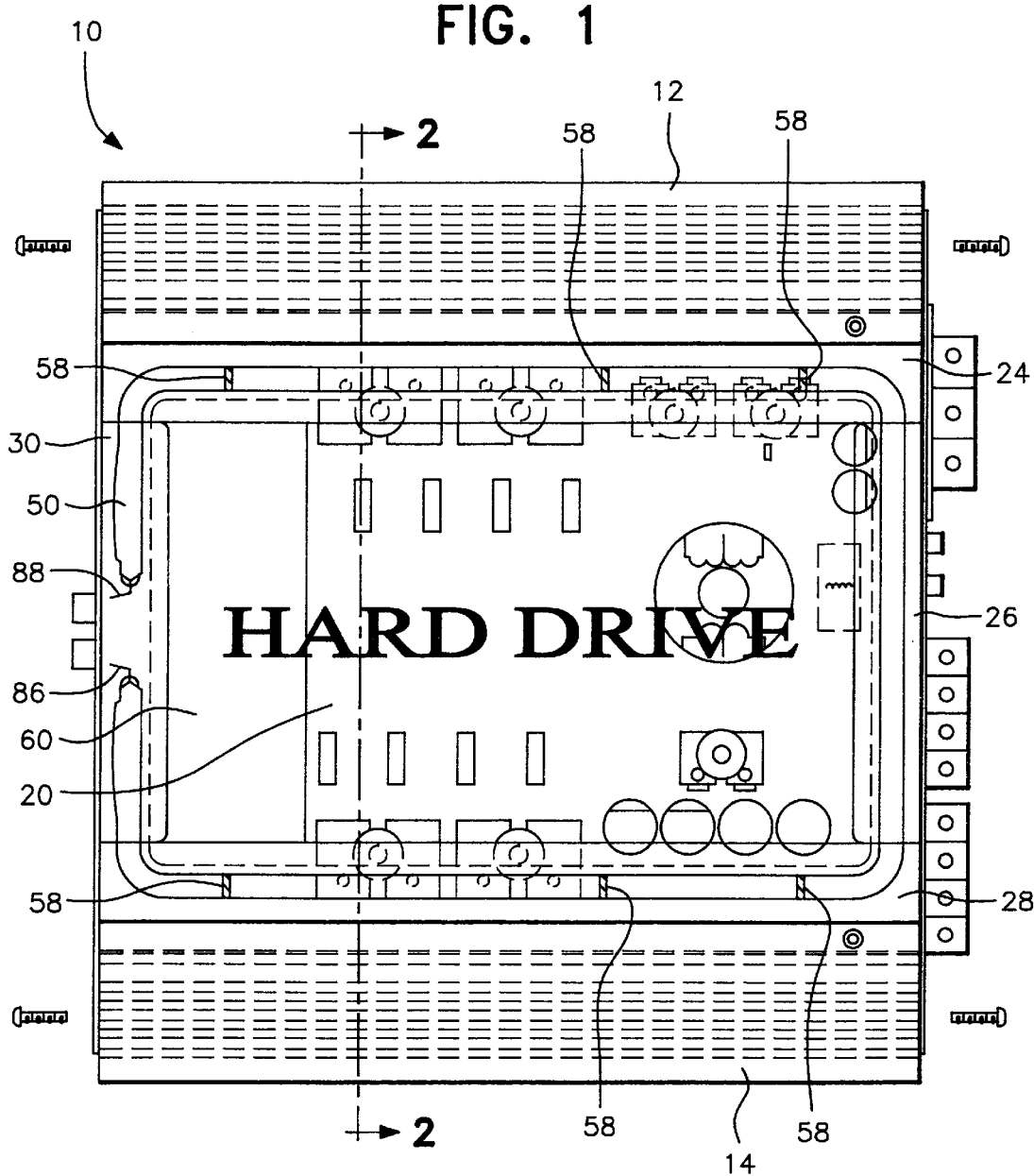
FIG. 1 is a plan view of a car audio amplifier having a transparent cover plate surrounded by a black light or neon gas light and having a shielded preamplifier portion of the amplifier chassis made in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose. While the instant inventive concepts are applicable to audio amplifier in general, since a principal application of these concepts is in the field of automobile audio amplifiers, the preferred embodiments will be discussed below with respect to such products.

Figure 2:
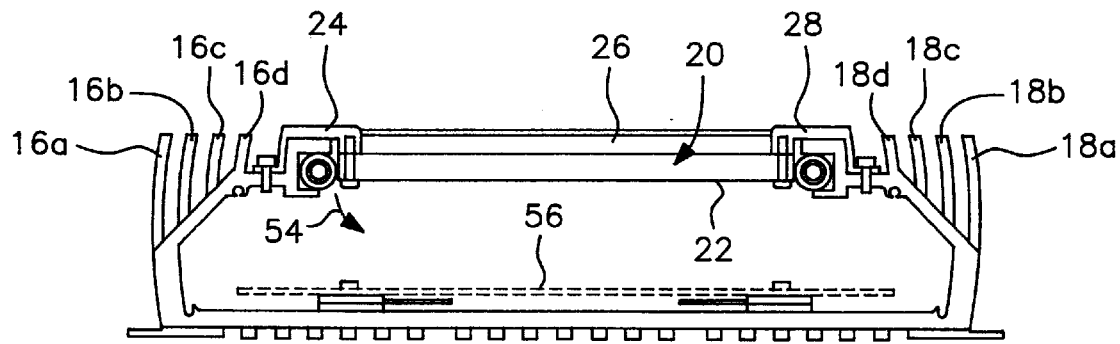
FIG. 2 is a cross sectional view of the car audio amplifier shown in FIG. 1, taken along line 2—2.
Figure 3:
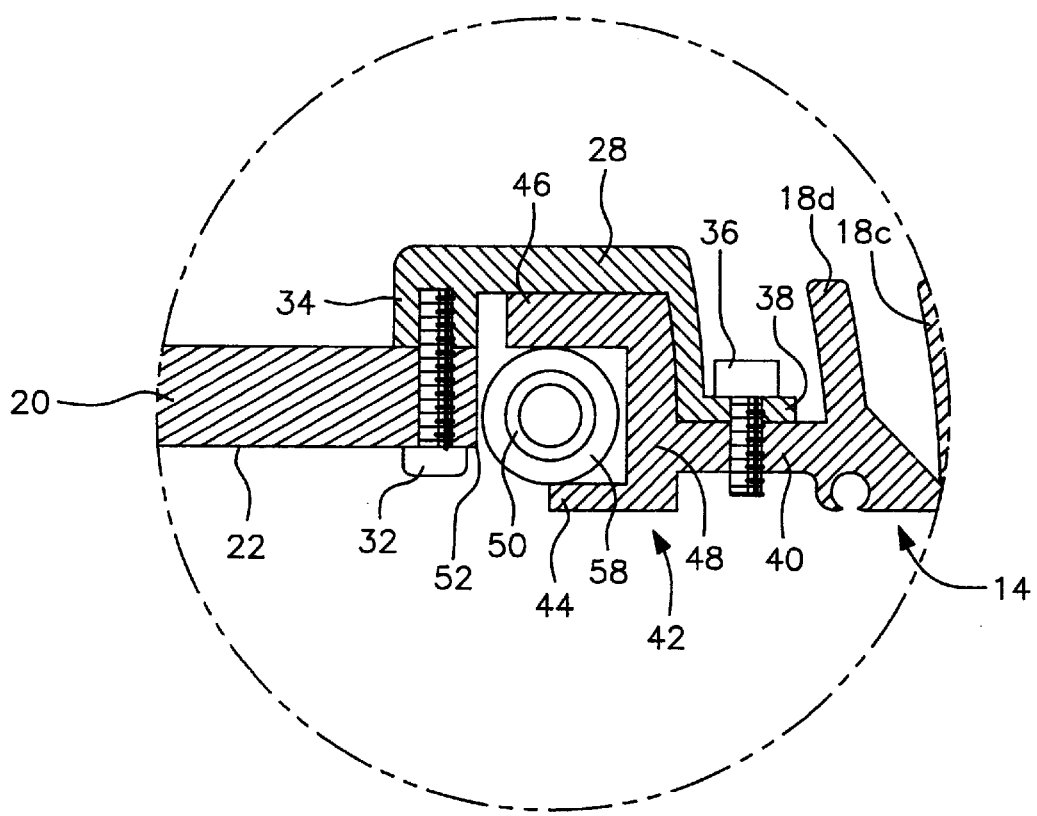
FIG. 3 illustrates an enlarged portion of the cross sectional view shown in FIG. 2 to demonstrate the details of a black light or neon gas light surrounding a side peripheral edge of a transparent cover plate for a car audio amplifier.

With reference to the drawings, in general, and to FIGS. 1–3, in particular, one embodiment of a car audio amplifier embodying the teachings of the subject invention is generally designated as 10. The specific construction of the amplifier may be varied widely without departing from the instant inventive concepts, but the disclosed embodiments will be described in detail for illustrative clarity. With reference to FIG. 1, the car audio amplifier 10 includes two side rails 12 and 14 which are heat sinks, to draw off the heat produced by the amplifier. By the spacing of a plurality of upstanding fins 16a–16d, forming part of side rail 12, and fins 18a–18d forming part of side rail 14, heat is dissipated into the surrounding environment.

Spaced inwardly and held between the side rails 12 and 14 is a transparent cover plate 20 made of a sheet of any plastic material capable of being "side lighted." One such material is methyl methacrylate, commonly marketed under the trademark PLEXIGLAS.

Any desired design or pattern or message may be inscribed into a surface of the cover plate 20, the words "HARD DRIVE" being illustrated in FIG. 1. Preferably, the design is formed in the undersurface 22 of the cover plate 20 to avoid collection of dust, although broadly, other or both surfaces may be etched or engraved to provide a design or message.

Surrounding the cover plate on four sides are four angled frame sections 24, 26, 28 and 30. Frame sections 24, 28 are located adjacent to and inwardly (with respect to proximity to cover plate 12) of side rails 12, 14, respectively.

For illustrative purposes, the elements located below the frame sections are shown in FIG. 1. However, these frame sections are of an opaque material so that the elements located below the frame sections are normally hidden from view.

With reference to FIG. 3, a plurality of upwardly extending screws 32 pass through transparent cover plate 20 and into a downwardly extending section 34 of each frame section to secure the transparent cover plate in place. In addition, a downwardly extending screw 36 extends through a horizontally extending flange 38 of rail sections 24 and 28 and into a horizontally extending section 40 of side rails 12 and 14.

A C-shaped extension 42 extending from the horizontally extending section 40 of rails 12 and 14 includes arms 44, 46 and cross piece 48. Located between the arms 44, 46, in a successive progression, as shown in FIG. 1, extending from frame section 30 to frame section 24, to frame section 26, to frame section 28 and back to frame section 30, is a glass tube 50. Glass tube 50 may either be a black light or a neon gas light.

As shown in more detail in FIG. 3, the glass tube 50 is positioned adjacent to a peripheral edge 52 of transparent cover plate 20 so as to laterally transmit light produced by a black light or a neon gas light through the transparent cover plate until encountering an etched or engraved pattern in the transparent cover plate. In the example of FIG. 1, the words "HARD DRIVE" would appear to be illuminated without any additional portions of the transparent cover plate being lit and with the source of the light (glass tube 50) being concealed from view by the frame sections 24, 26, 28, 30.

Portions of the interior of the amplifier may be hidden from view by an opaque plate (not shown), if desired. However, if it is desired to visually present the interior of the amplifier, the light from the tube 50 may also be directed downwardly in a direction of arrow 54 in FIG. 2 so as to illuminate amplifier chassis 56 as seen through cover plate 20.

To secure and protect glass tube 50, silicone rubber O-rings 58 are spaced along and surround glass tube 50 in the portions of the tube 50 located in C-shaped extensions 42 of side rails 12 and 14. The O-rings 58 help protect the glass tube 50 by absorbing shock as is normally experienced in a car audio amplifier due to road conditions. In addition, the O-rings 58 are wedged between arms 44, 46 so as to secure the glass tube 50 in place.

Figure 4:
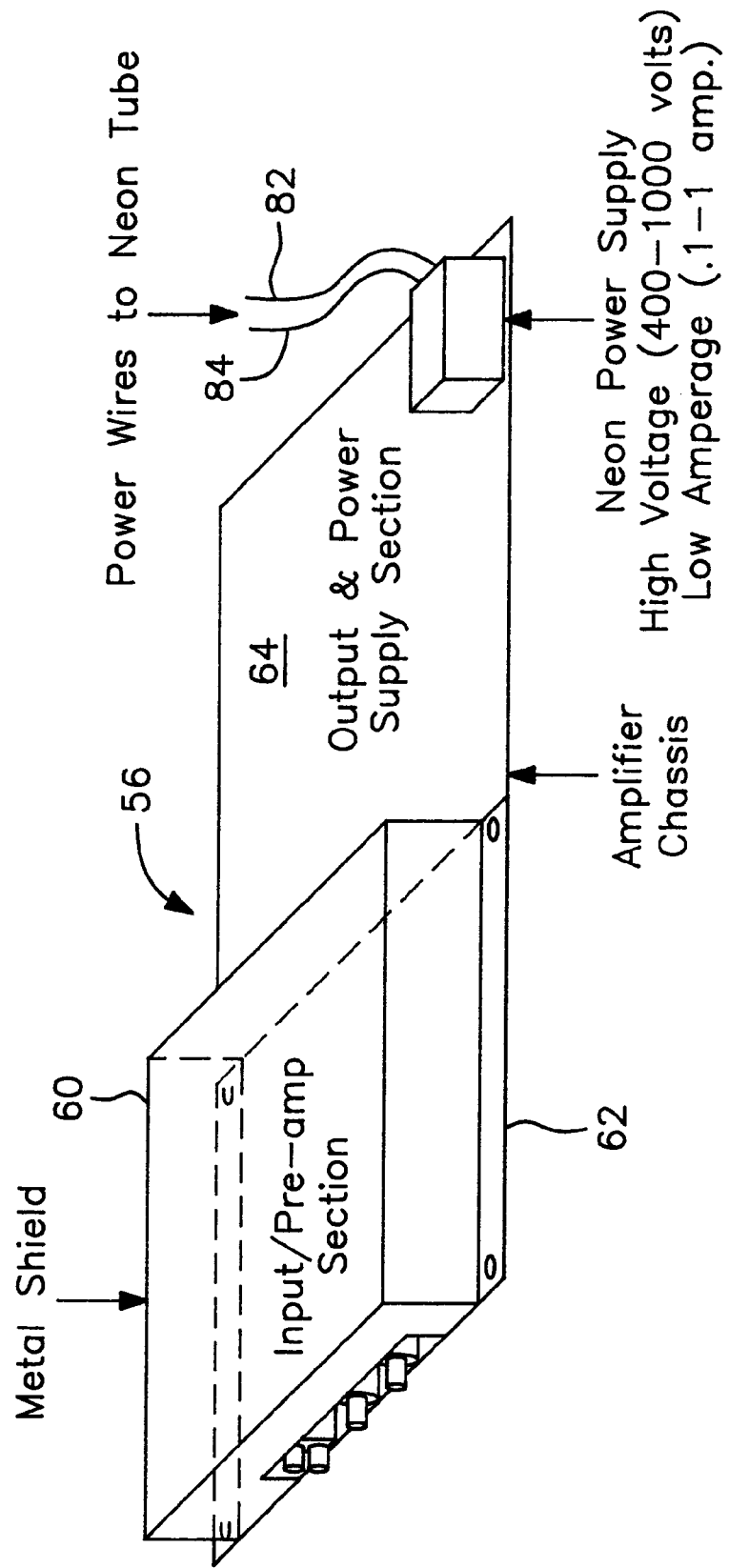
FIG. 4 is a schematic illustration of an AC power supply mounted on an audio amplifier chasis and a protective shield covering a preamplifier section of the audio amplifier chassis.

As schematically shown in FIG. 4, the amplifier chassis 56 includes an input/preamplifier section 62 and an output and power supply section 64. A metal shield 60 cover is provided to cover the preamplifier section 62, thereby preventing alternating current (AC) noise from the AC power supply 80 from interfering with the operation of the amplifier. The power supply 80 is positioned as far as possible from the input/preamplifier section 62, but may still be mounted on the amplifier chasis if the pre-amp is shielded as shown, with two power communicating wires 82, 84 connected to electrical leads 86, 88 extending from opposite ends of glass tube 50 as shown in FIG. 1.

Figure 5:
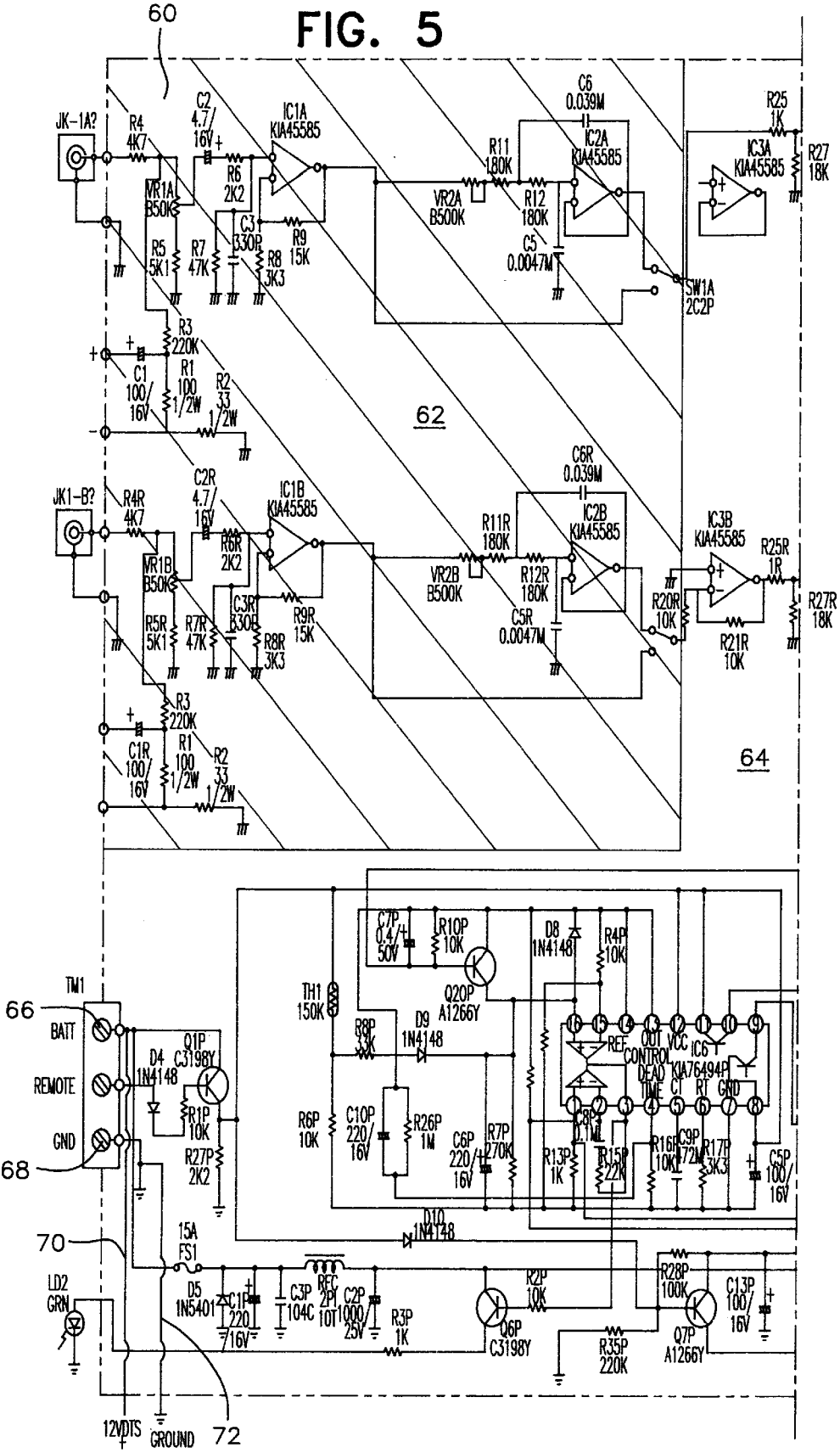
FIG. 5 is a schematic of one from of electrical circuit for an amplifier, with having a protective shield covering a preamplifier section of the chassis and including a common power source for the amplifier chassis and an AC power supply for a black light or neon gas light.
Figure 5A:
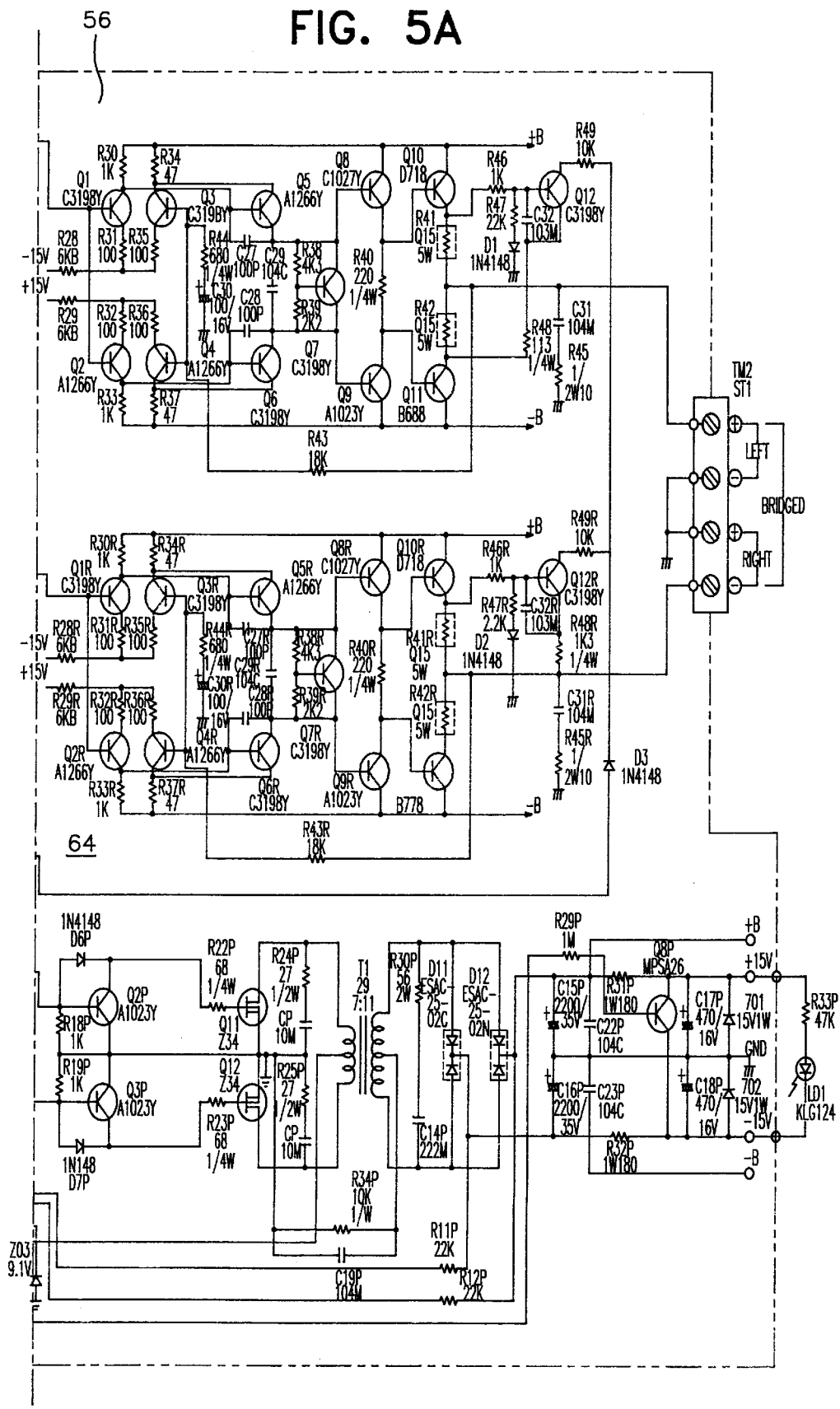

In FIG. 5, an example of an amplifier circuit 56 is shown, the details of which need not be described since they are not important to the instant inventive concepts. This illustration is representative of only one example of the circuitry of a car audio amplifier. It will be recognized, however, that other amplifier circuits may be used in a similar manner to obtain the advantageous results of the present invention.

In FIG. 5, the metal shield 60 is illustrated by hatch marks as covering the preamplifier section 62. The remaining portions of the circuit board include the output and power supply sections 64.

Power from the automobile battery is introduced at terminal 66 and a ground connection is shown at terminal 68. In the exemplary circuit board, power supply for the AC power supply 80 for the neon or black light is provided by wire 70 connected to the battery terminal 66 and wire 72 connected to the ground terminal 68. DC power is supplied to the power supply 80 where it is converted to AC and transmitted to glass tube 50. The preamplifier section 62 being protected by metal shield 60, AC interference noise from power supply 80 is virtually eliminated.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. An audio amplifier comprising:

a housing having an interior portion, an amplifier chassis positioned in said housing, an amplifier mounted on said amplifier chassis, said amplifier being powered by a direct current source and including a preamplifier section and a power supply section, a transparent cover plate overlying said amplifier chassis, a light source carried by said housing and powered by alternating current for illuminating said interior portion of said housing to render said interior portion viewable through said transparent cover plate, a converter mounted in said power supply section for converting direct current from said direct current source to said alternating current thereby providing power supply for said light source, and a shield positioned to protect said preamplifier section from alternating current interference.

2. An audio amplifier as claimed in claim wherein said cover plate is spaced above said amplifier chassis and said amplifier is viewable through said cover plate.

3. An audio amplifier according to claim 1 for use in an automobile.

4. An audio amplifier as claimed in claim 1, wherein said light source is a black light.

5. An audio amplifier as claimed in claim 1, wherein said light source is a neon gas light.

6. An audio amplifier as claimed in claim 1, wherein said selected portion is shielded by a metal cover.

7. An audio amplifier as claimed in claim 1, wherein said light source is directed towards a peripheral side edge of said cover plate and towards said amplifier.

\* \* \* \* \*